United States Patent [19]

Hoggard et al.

[11] Patent Number: 5,185,300
[45] Date of Patent: Feb. 9, 1993

[54] EROSION, THERMAL SHOCK AND OXIDATION RESISTANT REFRACTORY COMPOSITIONS

[75] Inventors: Dale B. Hoggard; Quentin K. Robinson, both of Allegheny County, Pa.

[73] Assignee: Vesuvius Crucible Company, Pittsburgh, Pa.

[21] Appl. No.: 667,483

[22] Filed: Mar. 11, 1991

[51] Int. Cl.$^5$ .............................................. C04B 35/58
[52] U.S. Cl. ........................................ 501/99; 501/96; 501/102; 501/103
[58] Field of Search .................. 501/87, 96, 97, 99, 501/102, 103

[56] References Cited

U.S. PATENT DOCUMENTS

| | | | |
|---|---|---|---|
| 4,540,675 | 9/1985 | Morris et al. | 501/99 |
| 4,870,037 | 9/1989 | Hoggard et al. | 301/97 |
| 4,871,698 | 10/1989 | Fishler et al. | 501/97 |
| 4,913,408 | 4/1990 | Hoggard et al. | 266/280 |

FOREIGN PATENT DOCUMENTS 2724430 12/9177 Fed. Rep. of Germany .

Primary Examiner—Karl Group
Assistant Examiner—Chris Gallo
Attorney, Agent, or Firm—Webb Burden Ziesenheim & Webb

[57] ABSTRACT

A refractory material possessing excellent erosion, thermal shock and oxidation resistance, as well as resistance to oxide build up useful in continuous casting of steel for use in such articles as tundish shrouds, particularly for slagline sleeves, bore liners and upper seating areas in such shrouds, as well as for stopper rod noses. The material consists of the following by weight: (a) carbon, from about 4% to about 50%; (b) one or more members selected from the group consisting of zirconium di-boride and titanium di-boride in an amount of from about 10% to about 90%; and (c) one or more members selected from the group consisting of zirconia, SiAlON, clay, alumina, magnesia, silica, silicon carbide, silicon nitride, boron nitride, mullite and chromia in an mount of from about 10% to about 80%.

10 Claims, 1 Drawing Sheet

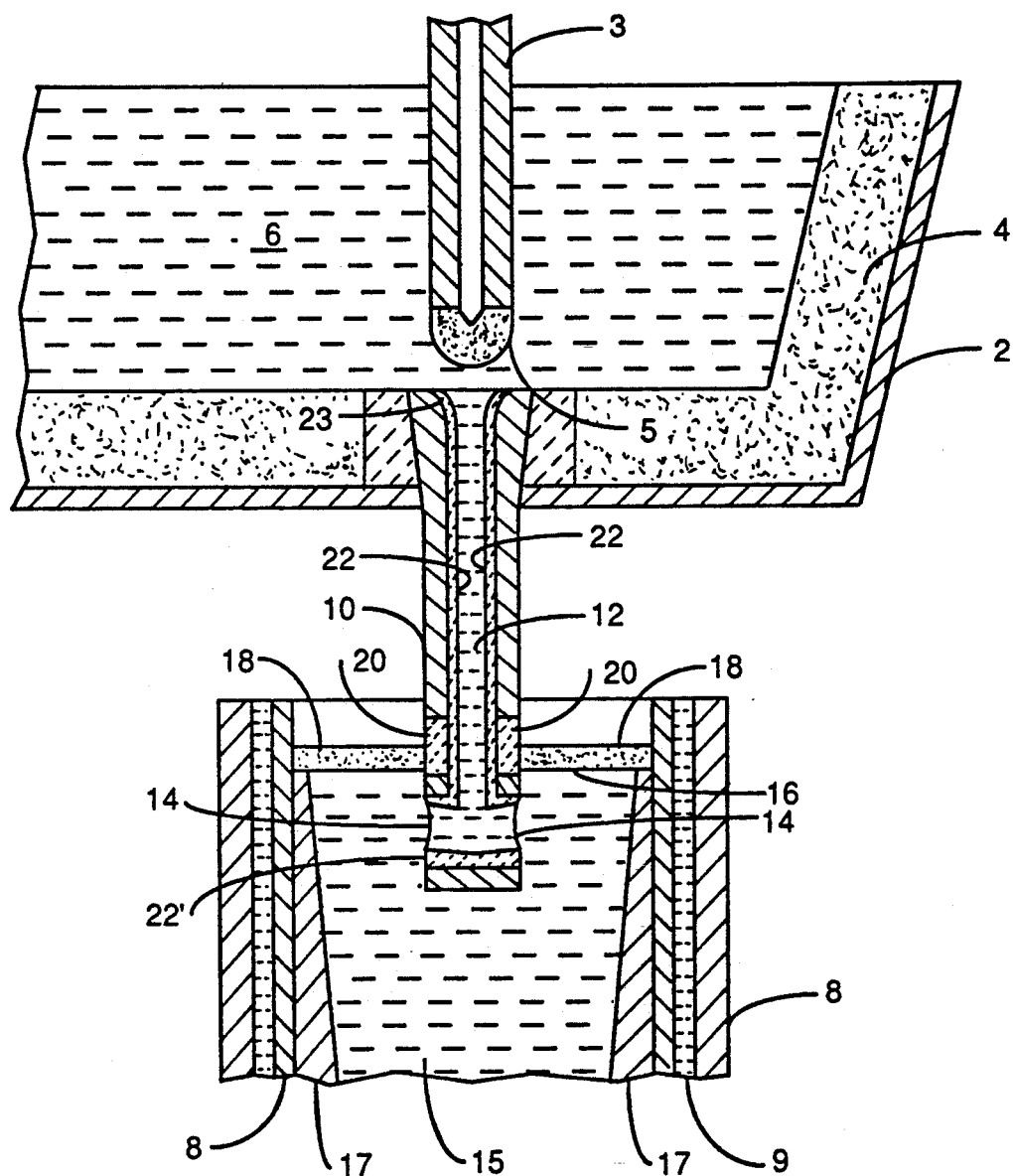

EROSION, THERMAL SHOCK AND OXIDATION RESISTANT REFRACTORY COMPOSITIONS

BACKGROUND OF THE INVENTION

The present invention relates generally to refractory compositions and articles made therefrom useful in metallurgical applications. More particularly, the invention relates to improved refractory compositions and bodies comprised of said compositions which can withstand the rigorous environment of molten metal and slag such as encountered during the continuous casting of molten steel. In the continuous casting of steel, special high refractory ceramic parts are employed to control the flow of molten metal and to protect the melt from oxidation as it is poured from ladles to tundishes and thence to the continuous casting molds. These refractory components include slidegate plates and stopper rods used to control the flow of molten metal, various collector nozzles in ladles and tundishes, and protective ladle shrouds or submerged pouring nozzles employed to protect the molten steel from oxidation during the metal transfer and casting operations. Naturally, these refractory articles are subjected to very harsh operating conditions, such as severe thermal shock during start-up and later exposure to the erosive and chemical attack of molten steel and slag. All of the refractory elements are subjected to the erosive effects of the molten media with the most severe attack occurring on the outer surface of the submerged pouring shroud or nozzle. This area is in direct contact with the chemically active molten slag layer which floats on the surface of the molten steel in the continuous casting mold. The area of the nozzle or shroud which contacts the slag/metal interface is known as the slagline and has long been an area of concern for both steel makers and refractory manufacturers because of the excessive chemical attack which occurs in this area.

Specialty refractories have been developed for use in steel casting operations containing elemental carbon from such sources as graphite, pitch or coke as a carbonaceous binder or as a further addition. It is known that the inclusion of elemental carbon is beneficial in protecting the finished refractory from chemical attack and erosion by molten metals and accompanying slags. Unfortunately, the carbon constituent itself is susceptible to oxidation and erosion by molten steel and common slags employed therewith. It is common practice to use a small amount of an antioxidant material, commonly referred to as glass formers, to protect the carbon from oxidation. Such known antioxidants include silicon carbide, silica, borax or other boron containing compounds in an amount of about 2-8% by weight. Common carbon bonded ceramic materials which are used in continuous steel casting applications include refractory grains and/or powders of aluminum oxide, zirconium oxide, clays, magnesium oxide, silicon carbide, silica and other dense grain such as SiAlON.

It is also common practice to manufacture refractory bodies, such as submerged pouring shrouds or nozzles as a composite structure in order to increase the service life of the article. For example, the body of the shroud may be of a carbon bonded alumina and graphite refractory material having an erosion resistant slagline sleeve section formed of a carbon bonded zirconia and graphite refractory material. The body and sleeve are copressed and then fired. The sleeve is located in the region where the submerged nozzle is in contact with the slag/metal interface. The copressed zirconia graphite slagline sleeve exhibits improved slag erosion resistance compared with nozzles with are entirely of carbon bonded alumina graphite refractory.

It has also been observed that the erosion resistance is increased by decreasing the porosity of the ceramic body, i.e., by making the fired body more dense in order to improve its resistance to high temperature gaseous and liquid phase attack. Unfortunately, when the porosity of a ceramic body is increased to improve erosion resistance, there is generally a concurrent decrease in the thermal shock resistance of the body. This has been a problem in currently known materials and continues to perplex those who wish to formulate a material system which is capable of withstanding the corrosive and erosive effects of molten steel and slag and to resist oxidation while also possessing the desired thermal shock resistance properties.

Prior attempts to improve the erosion and oxidation resistance in carbon containing refractories are exemplified in commonly assigned U.S. Pat. No. 4,540,675 to Morris, et al. which proposes the use of boron carbide as an addition in an elemental carbon containing refractory composition. Commonly assigned U.S. Pat. No. 4,877,705 to Polidor teaches a submerged pouring nozzle having a plasma sprayed slagline sleeve of a fused refractory oxide material such as stabilized zirconia, zircon, alumina and like refractory materials. U.S. Pat. No. 4,871,698 to Fishler, et al. and also commonly assigned to the assignee of the present application, discloses slagline sleeve materials comprising pressed and fired mixtures of SiAlON and/or silicon nitride and carbon which exhibit superior slag resistance. In addition, U.S. Pat. No. 4,210,264 teaches the use of silicon carbide in carbon based refractories; German Patent No. 2,724,430 teaches that silicon carbide, zirconium di-boride, and boron nitride in finely divided form are suitable as partial or complete replacements of the graphite or amorphous carbon in carbon based refractories. Hence, it appears that the use of antioxidants, including zirconium di-boride, is known in the art to protect carbon containing refractories from oxidation.

A still further problem encountered in the continuous casting of steel, and particularly so-called aluminum killed steel, is the phenomenon of alumina build up in the interior bore of the pouring nozzle or shroud. This common occurrence proceeds with time and if unchecked will cause the pouring nozzle to become completely clogged which results in a premature stoppage of the casting campaign. Special bore liners of various refractory compositions have been proposed to prevent and/or minimize the formation of alumina in the pouring nozzle or shroud bore during the casting of aluminum killed steels. Exemplary of such liner compositions are those disclosed in commonly assigned U.S. Pat. No. 4,870,037 to Hoggard, et al., which teaches the advantages of a liner made from a carbon bonded SiAlON-graphite material. Commonly assigned U.S. Pat. No. 4,913,408 to Hoggard, et al. teaches liner compositions consisting essentially of carbon and a composite selected from the group consisting of zirconia and O'SiAlON and zirconia and silicon oxynitride as effective in preventing alumina formation during the casting of aluminum killed steels.

In aluminum killed steels, the aluminum addition reacts with the dissolved oxygen or iron oxide to form finely dispersed aluminum oxide, some of which floats into the slag above the molten steel and some of which remains as highly dispersed micro-particles in the solidified steel. During continuous casting, this extremely fine alumina has a tendency to precipitate out of the molten steel on to the cooler refractory surfaces or to react or stick to the ceramic refractories that line the molten steel path from the ladle to tundish to the casting mold. The precipitated alumina has a particular affinity to the typical carbon-bonded alumina-graphite refractories utilized as ladle shrouds and submerged pouring nozzles. The alumina will continue to build up in the pouring nozzle until the flow of molten steel is reduced to a point that the nozzle must be lanced by an oxygen torch, or discarded. If oxygen lancing becomes necessary, the casting process is disrupted, costing time and money. When this occurs, casting efficiencies decrease, which causes a subsequent downgrading of the quality of the steel. A total alumina blockage of a sub-entry nozzle also decreases the expected life of the refractories and is very costly to steel producers.

The particular refractory compositions of the present invention can be formed as interior liners on submerged pouring nozzles, ladle shrouds, collector nozzles and the like to provide a surface for resisting the build up of alumina and other oxides during the casting of aluminum killed steel. In addition, the compositions of the present invention are useful as various casting components such as slagline sleeves which offer superior resistance to erosion, thermal shock and oxidation resistance so as to increase the useful life of the refractory components, for example, a pouring nozzle.

SUMMARY OF THE INVENTION

According to the present invention, a novel refractory composition is provided which includes zirconium di-boride or titanium di-boride incorporated in a carbon-bonded refractory. The zirconium di-boride or titanium di-boride is present in an amount of at least 5% and preferably at least 10%, and still more preferably, in an amount greater than 20% by weight to about 95% by weight. As a partial substitution for zirconia and amorphous carbon, compositions according to the present invention preferably contain zirconia and/or SiAlON in an amount of about 60%; one or more other diluting refractory grains or powders such as silica, alumina, silicon carbide, mullite, chromia, clay or like materials from 0% to about 70%; zirconium di-boride or titanium di-boride from about 10% to about 95%; carbon as a binder plus graphite from about 4% up to about 50%. In practice, the zirconium di-boride or titanium di-boride acts as a sacrificial oxygen getter, thus sparing the carbon or graphite from oxidation. Thus, the present invention provides compositions and a refractory article for improved erosion, thermal shock and oxidation resistance, particularly in the area of a slagline sleeve of a pouring nozzle and as a material suitable for use as a liner surface for minimizing alumina and other oxide build up in pouring nozzles during the continuous casting of aluminum killed steels. The improved erosion resistant properties of the present invention also renders the material suitable for use as a stopper rod nose and as a seating area around the inlet orifice of the pouring nozzle which bears against the stopper rod nose when the metal flow is stopped.

A pouring shroud or nozzle, according to the present invention, comprises a body having a central bore extending axially from an inlet end to an outlet end. The nozzle body is preferably formed of a conventional carbon bonded, alumina-graphite refractory and contains a slagline sleeve around a circumferential portion of the exterior in contact with the molten slag. The slagline sleeve is of a composition, according to the present invention, which includes zirconium di-boride or titanium di-boride material incorporated therein. The central bore of the nozzle body includes an integral lining therearound and a seating area around the inlet end of the bore, likewise, formed of the improved composition of the present invention. The pouring nozzle further includes exit ports at the outlet lined with the improved material of the present invention so as to minimize unwanted erosion and alumina formation and thus preclude premature wear or blockage of molten metal flow. The materials of the present invention can be conveniently isostatically copressed with the alumina graphite nozzle body and then fired in a reducing atmosphere.

BRIEF DESCRIPTION OF THE DRAWING

The drawing figure depicts a partially fragmented, cross-sectional side view of a bottom pour tundish with a stopper rod and submerged pouring nozzle, including a slagline sleeve and anti-alumina build up liner according to the present invention shown delivering molten metal to a continuous casting mold.

DETAILED DESCRIPTION OF THE DRAWING

In the drawing, a submerged shroud or pouring nozzle 10 is shown in place on a conventional bottom pour tundish 2. The tundish has a refractory lining 4 which contains a molten bath of metal 6, for example, aluminum killed steel which is transferred by way of the nozzle 10 to a conventional continuous casting mold 8. The mold 8 includes a water jacket 9 therearound for chilling the mold. The nozzle 10 has an internal bore 12 extending axially from an inlet end at the tundish 2 to an outlet end positioned within the mold 8. A plurality of exit ports 14 are formed at the outlet end of the nozzle and communicate with the internal nozzle bore 12. During a continuous casting run, the molten steel 6 flows from the tundish 2 to the nozzle 10 and passes through the internal bore 12 to exit the nozzle via ports 14 positioned beneath a surface 16 of the molten metal. A vertically moveable stopper rod 3 or other conventional means such as a slidegate valve (not shown) controls the flow of metal 6 from the tundish 2. The nose portion 5 of the stopper rod engages a seating area 23 of the nozzle 10 when the stopper rod is lowered to shut off the flow of metal. A copressed stopper rod body with a nose portion 5 is disclosed in commonly assigned U.S. Pat. No. 4,791,978 to Fishler. The discharge end of the nozzle or shroud 10 is thus positioned within the interior of a molten metal core 15 of a solidified strand 17 which slowly descends from the bottom of the mold 8. Use of the submerged entry nozzle 10 prevents splashing and oxidation of the molten steel, among other well-known advantages. One commonly used refractory composition for the body of nozzle 10 is a carbon bonded alumina graphite which is particularly suited for this environment due to its excellent thermal shock and steel erosion resistant properties.

It is common practice in continuous casting operations to employ a layer of mold powder above the metal surface 16 in order to capture and prevent the entry of non-metallic inclusions into the molten metal. In addition, the mold powder serves as a lubricant and provides surface protection for the strand of solidified metal 17 as it leaves the mold 8. Commonly used mold powders are comprised of mixtures of oxides have a relatively low melting point which form a molten slag layer 18 that floats on the surface 16 of the molten metal within the mold. It is observed that the area of the nozzle 10 in contact with the slag layer 18, commonly referred to as the slagline or powder line area, undergoes chemical erosion at a higher rate than the balance of the nozzle body.

In order to extend the life of the nozzle body 10, it is common to provide a submerged nozzle with a slagline sleeve or insert 20 of a material which is of a higher resistance to the chemical attack of the mold powder slag. Such materials which may be used as a suitable refractory for the slagline sleeve 20 are carbon bonded zirconia-graphite, carbon bonded SiAlON graphite or any of the novel compositions disclosed in the prior art patents discussed above. The life of the nozzle 10 is determined to a great extent by the erosion resistance of the slagline material, as well as the ability of the nozzle to resist alumina build up in the bore 12 during casting. We have discovered that the improved compositions of the present invention when utilized in the slagline sleeve 20 in a nozzle liner 22 and seating area 23 formed around the central bore 12, as well as in a liner 22', formed around the exit ports 14 dramatically increases the life of the nozzle 10 by its ability to resist the corrosion, thermal shock and oxidation in the areas of the slagline sleeve and seating area, while also providing superior resistance to alumina build up in the area of the liner and exit ports of the nozzle. In addition, the life of the nose portion 5 of the stopper rod 3 which is subjected to a high erosion environment may be increased when made from compositions according to the present invention.

Refractories in contact with molten metals are typically subjected to extreme changes in temperature during preheat and/or when the molten metal first comes in contact with the refractory and, thus, these materials are greatly susceptible to the dangers of cracking due to thermal shock. Materials, notably natural flake graphite or pitch, are usually added to the refractory body to protect it from thermal shock. Graphite has a high thermal conductivity which is an important prerequisite for providing thermal shock resistance. Flake graphite is anistotropic having a very high thermal conductivity in one direction on the order of about 500 W/mK at 20° C. Amorphous carbon has a rather low thermal conductivity compared to graphite. Zirconia has a thermal conductivity of approximately 3 W/mK at 20° C., while zirconium di-boride has a thermal conductivity of approximately 100 W/mK, and titanium di-boride has a thermal conductivity of approximately 100 W/mK at 20° C. It is well-known that zirconia has a poor thermal shock resistance despite its advantage with respect to good corrosion resistance. While boron compounds, including zirconium di-boride, have been utilized in small amounts in the prior art in carbon-based refractories as an antioxidant as a partial substitute for carbon, the present invention utilizes zirconium di-boride and titanium di-boride in much larger amounts as partial or complete substitutes both for carbon and for other refractory materials, most notably for zirconia and for SiAlON.

According to the invention, zirconium di-boride and/or titanium di-boride is incorporated directly into a carbon-based refractory comprising graphite and amorphous carbon, or they can be used to replace a portion of the components of a carbon-based refractory. For example, zirconium di-boride or titanium di-boride may replace partially or wholly either the amorphous carbon or a graphite constituent or the refractory oxides, carbides, or nitrides, which are typically used in carbon based refractories. Examples include, but are not limited to alumina, mullite, silica, zirconia, magnesia, silicon carbide, silicon nitride, boron nitride, chromia and SiAlON. The zirconium di-boride and/or titanium di-boride constituent(s) is added to the refractory grain or powder during the mixing stage as a fine powder of less than 40 microns or as a pre-sintered or fused grain having a particle size of less than 1 millimeter.

In the practice of the invention, the oxidation of carbon or graphite is decreased dramatically by the presence of the zirconium di-boride or titanium di-boride while the erosion resistance is enhanced. The mechanism responsible for the improved oxidation and erosion resistance is complex and it is believed that zirconium di-boride protects the amorphous carbon and graphite according to the following chemical reaction equation:

$$ZrBr_2 + 5/2 O_2 = ZrO_2 + B_2O_3$$

Thus, it is believed that zirconium di-boride and titanium di-boride act as sacrificial oxygen getters, so as to spare the carbon or graphite from oxidation. Zirconium di-boride and titanium di-boride have a high affinity for oxygen at elevated temperatures. The reaction proceeds at elevated temperatures greater than 500° C. up to and above temperatures at which the refractory is used and will continue if sufficient gaseous oxygen is present. The reaction predicts that solid zirconium di-boride or titanium di-boride and gaseous oxygen will react to form solid zirconia or titania and liquid boron oxide. The volume change associated with this reaction is considerable, i.e., an almost tripling of the volume of the original di-boride compound. The increase in volume is beneficial in decreasing oxidation in porous refractories since the reaction product, liquid boron oxide, fills the pores of the refractory. The oxidation of the refractory must proceed by oxygen diffusing through the pores of the refractory and when the pores are blocked, oxidation is naturally inhibited. The formation of liquid boron oxide by the above reaction thus inhibits oxidation because the liquid boron oxide reaction product forms a glassy shield over the carbon and graphite which prevents penetration by gaseous oxygen. A further advantage of the zirconium di-boride constituent in providing superior corrosion resistance, particularly in a zirconium graphite material, is through the formation of zirconia as one of the reaction products of the chemical equation set forth above. The in situ formation of extra zirconia, which in itself is known to have excellent erosion resistance, is obviously beneficial.

In addition, the incorporation of zirconium di-boride or titanium di-boride in a carbon-based refractory increases the thermal shock resistance of the carbon-based refractory since the lower thermal conductivity material such as zirconia and amorphous carbon are replaced with the higher thermal conductivity compounds of zirconium di-boride and titanium di-boride. Hence, the overall conductivity of the carbon-based refractory system is increased, thus increasing its thermal shock resistance properties.

EXAMPLE

Three compositions, identified as Mix A, B and C, were prepared by commonly known processing techniques and are set forth in Table I. Mix A is a typical alumina-graphite carbon-based refractory which does not possess particularly good slag erosion resistance, although it does have a high thermal conductivity and, therefore, good thermal shock resistance. Mix B is a typical zirconia-graphite carbon-based refractory which possesses excellent erosion resistance to slag, although the thermal shock resistance is not as good as Mix A. Mix C represents a refractory composition according to the present invention utilizing zirconium di-boride wherein the zirconium di-boride has replaced a portion (18% by weight) of the zirconia content of Mix B. Mix C possesses a higher thermal conductivity than Mix B despite having the same amount of graphite. Furthermore, it is seen that the slag erosion resistance of Mix C is greater than that of Mix B which heretofore has been considered to be superior among conventional prior art materials.

TABLE I

| Chemistry (%) | (in weight %) | | |
|---|---|---|---|
| | Mix A | Mix B | Mix C |
| $SiO_2$ | 16 | 5 | 5 |
| $Al_2O_3$ | 52 | — | — |
| $ZrO_2$ | — | 77 | 53 |
| $ZrB_2$ | — | — | 24 |
| Carbon + Graphite | 32 | 18 | 18 |
| Erosion Index | 25 | 10 | 8 |
| Thermal Conductivity | 20 | 11 | 13 |

A number of nozzles were prepared having a liner portion 22 made from compositions according to the present invention, including $ZrB_2$ and $TiB_2$, reported in Table II. These various compositions were run in casting trials in order to determine the ability of the materials to resist alumina build up and to resist erosion during the casting of aluminum killed steel. The results of these casting trials are reported in Table III.

TABLE II

| Constituent | Sample (in weight %) | | | | | |
|---|---|---|---|---|---|---|
| | #1 | #2 | #3 | #4 | #5 | #6 |
| $ZrB_2$ | 59.6 | 30.9 | 35.4 | — | — | — |
| BN | — | 30.9 | — | — | — | — |
| $TiB_2$ | — | — | — | 69.8 | 37.9 | 39.0 |
| $ZrO_2$ | — | — | 35.4 | — | 36.2 | — |
| SiAlON | 11.4 | — | — | — | — | 27.8 |
| Carbon* | 20.3 | 26.0 | 22.1 | 20.8 | 18.3 | 23.0 |
| BC | 2.6 | 1.5 | 1.8 | 1.6 | 1.5 | 1.8 |

*As fired carbon content, including a predominant amount of graphite plus carbonaceous binder.

TABLE III

| Sample | $Al_2O_3$ Build-up Rank* | Erosion (%) | Porosity (%) |
|---|---|---|---|
| #1 | 1.9 | 0 | n/a |
| #2 | 3.2 | 100 | 16.5 |
| #3 | 2.5 | 0 | 16.5 |
| #4 | 3.3 | 75 | 21.9 |
| #5 | 3.3 | 50 | 14.5 |
| #6 | 2.6 | 25 | 16.4 |

*1 = Excellent; 4 = Poor.

It is observed from Tables II and III that all samples, except Sample #2, and to a lesser extent Sample #4, exhibited excellent to good erosion resistance and an ability to resist alumina build up during casting of aluminum killed steel.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A refractory composition consisting essentially of, by weight:
   (a) carbon supplied predominately from a graphite source in an amount of from about 4% to about 50%;
   (b) zirconium di-boride in an amount of from about 20% to about 80%; and
   (c) zirconia in an amount of from about 10% to about 75%.

2. The refractory composition of claim 1 consisting essentially of, by weight:
   (a) carbon supplied predominately from a graphite source in an amount of from about 20% to about 30%;
   (b) zirconium di-boride in an amount of from about 30% to 70%; and
   (c) zirconia in an amount of from about 10% to about 55%.

3. A refractory composition consisting essentially of, by weight:
   (a) carbon from about 15% to about 25%;
   (b) zirconium di-boride from about 30% to about 40%; and 40%;
   (c) zirconia from about 30% to about 40%; and further including
   (d) boron carbide from about 1% to about 5%.

4. An article for use in casting molten metal wherein the article includes a molten metal contacting surface of a carbon bonded refractory composition for resisting erosion, thermal shock, oxidation and oxide build-up consisting essentially of, by weight:
   (a) carbon from about 15% to about 50%;
   (b) zirconium di-boride in an amount of from about 10% to about 75%;
   (c) zirconia in an amount of from about 10% to about 75%; and
   (d) from 0% to about 8% boron carbide.

5. The article of claim 4 comprising a submerged entry tundish shroud.

6. The tundish shroud of claim 5 having at least a liner portion made from said carbon bonded refractory composition.

7. The tundish shroud of claim 5 having at least a slagline sleeve portion made from said carbon bonded refractory composition.

8. The article of claim 4 comprising a stopper rod having a nose portion made from said carbon bonded refractory composition.

9. A submerged tundish shroud for use in continuous casting of molten steel comprising:
   a body portion of a refractory material having a central axial bore for conveyance of molten steel therethrough from an inlet end to an outlet end of said body;
   a seating area portion surrounding said bore at the inlet end thereof;

a lining portion surrounding said central bore adapted to be in contact with said molten steel and a slagline sleeve portion formed around an exterior circumferential surface of the body adapted to contact a layer of slag in a continuous casting mold, at least one of said seating area portion, lining portion and slagline sleeve portion being made from a carbon bonded refractory composition consisting essentially of, by weight:
(a) carbon, from about 4% to about 50%;
(b) zirconium di-boride in an amount of from about 10% to about 90%; and
(c) zirconia in an amount of from about 10% to about 80%.

10. A tundish shroud wherein at least one of a seating area and slagline sleeve portion is made from a carbon bonded refractory composition consisting essentially of:
(a) carbon from about 15% to about 25%;
(b) zirconium di-boride from about 30% to about 40%;
(c) zirconia from about 30% to about 40%; and further including
(d) boron carbide from about 1% to about 5%.

* * * * *

UNITED STATES PATENT AND TRADEMARK OFFICE
CERTIFICATE OF CORRECTION

PATENT NO. : 5,185,300

DATED : February 9, 1993

INVENTOR(S) : Dale B. Hoggard and Quentin K. Robinson

It is certified that error appears in the above-identified patent and that said Letters Patent is hereby corrected as shown below:

Title page, item [57]
Abstract Line 14 "mount" should read --amount--.

Claim 3 Line 35 Column 8 delete "and 40%;".

Signed and Sealed this

Thirtieth Day of November, 1993

*Attest:*

BRUCE LEHMAN

*Attesting Officer*    Commissioner of Patents and Trademarks